Sept. 12, 1939.                J. G. ELKIN                  2,172,652
                         FINGER-LOCK TOOL HOLDER
                           Filed April 4, 1938
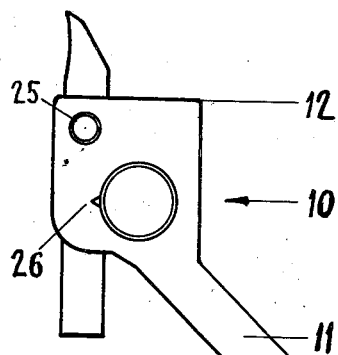
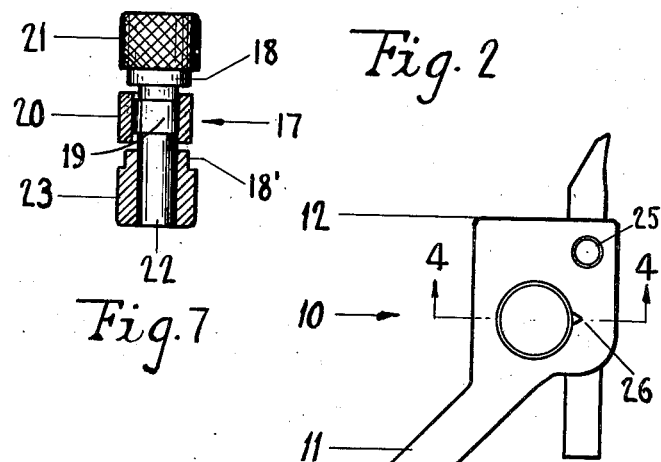
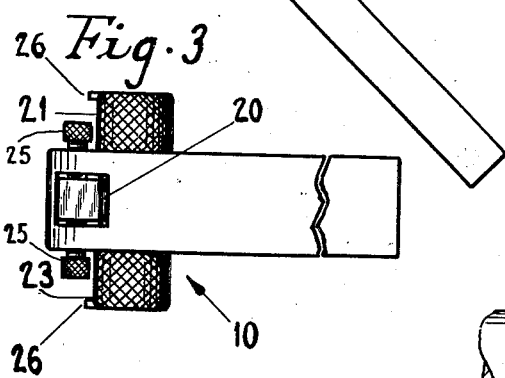
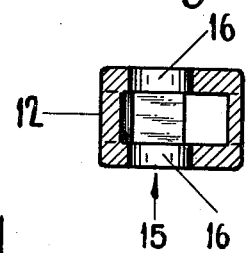
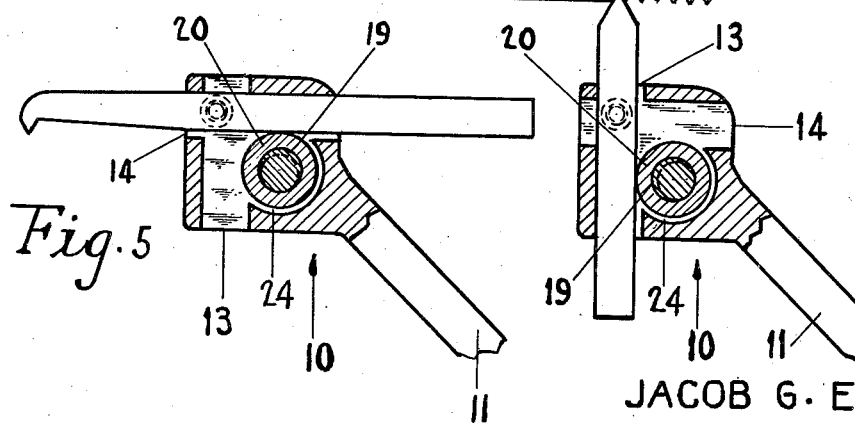
JACOB G. ELKIN
INVENTOR
BY *Joseph Blacker*
ATTORNEY Patented Sept. 12, 1939

2,172,652

UNITED STATES PATENT OFFICE 2,172,652

FINGER-LOCK TOOL HOLDER

Jacob G. Elkin, New York, N. Y.

Application April 4, 1938, Serial No. 199,776

10 Claims. (Cl. 29—99)

This invention relates to a universal and reversible tool holder for use in lathes, planers, shapers, etc., and an object of this invention is to provide a single holding device which is adapted to support in operating position any of the cutting tools used in such machines.

Another object of this invention is to provide a tool holder having two cutting tool slots positioned in right-angular relation and having common means for clamping a cutting tool in either slot.

Another object of this invention is to provide in a tool holder of the class described, a cylindrical clamping member rotatably mounted in a transverse opening in the head of the tool holder, the said member having an eccentric portion with a roller rotatably mounted thereon and the roller being adapted to bear against a cutting tool in either slot by rotating the clamping member approximately a quarter of the circumference.

Another object of this invention is to provide a finger-lock tool holder whereby the tool may be instantaneously locked and unlocked in the tool holder by a slight rotary motion of a finger-lock clamp, due to a roller which diminishes friction between the clamping surfaces.

Figure 1 is a plan view of the tool holder in position for supporting a left hand cutting tool.

Figure 2 is a plan view of the tool holder in position for supporting a right hand cutting tool.

Figure 3 is a bottom view of the tool holder.

Figure 4 is a cross-sectional view, the section being taken as on line 4—4 in Figure 2.

Figure 5 is a fragmentary view of the tool holder, partly in cross-section, the section being taken centrally through the head of the tool holder, and having a boring tool supported therein.

Figure 6 is a fragmentary view of the tool holder, partly in cross-section, the section being taken centrally through the head of the tool holder and shows a thread cutting tool supported therein.

Figure 7 is a plan view of a tool clamping device shown partly in section.

In the illustrated embodiment of the invention, the numeral 10 indicates a tool holder comprising a shank 11 and a head 12. The head 12 is of square cross-section and has two slots 13, 14 extending therethrough. The slots are positioned in right-angular relation and intersect each other, as best shown in Figures 5 and 6.

The head 12 has a transverse opening 15 extending therethrough. The slots 13 and 14 communicate with the opening 15.

The opening 15 extends through two bearings 16, 16 in the side walls defining the slots in the head 12. A cylindrical clamping member 17, best shown in Figure 7, is mounted in the opening 15. The member 17 comprises two journals 18, 18' adapted to fit in the bearings 16, 16. Intermediate the two journals is an integral eccentric portion 19, of circular cross-section. Freely rotatably mounted on the eccentric portion 19 is a roller 20 having concentric peripheries. The clamping member 17 has an integral knurled cylindrical collar 21 at one end and a reduced cylindrical portion 22 at the opposite end. A knurled collar 23 has been mounted on the end portion 22 in fixed engagement after assembling.

The collar 23 has been reduced in diameter at one end to form the bearing 18' which is of the same diameter as the bearing 18.

As shown in Figures 5 and 6, the tool holder 10 has been undercut as shown at 24 to permit the roller 20 and the eccentric 19 to rotate for locking the tool in either position.

It is to be noted that the rolling surface of the roller is in parallel relation with a side of the cutting tool and that the working pressure against the cutting tool causes an increase in the clamping pressure with which the cutter is held in the tool head. The clamping pressure increases in proportion to the pressure exerted due to cutting. The roller permits a clamping action against the cutter without wedging or binding. The roller also takes care of any overload and prevents breakage of the tool or the work in operation. The roller 20 has a rolling motion due to overload and absorbs the initial shock at the moment the cutting action commences. This rolling motion causes a binding action between the work and the tool post. The roller on the eccentric also works as an automatic brake. It is to be noted that the tool slot 13 has a wall 27 and that the tool slot 14 has a wall 27' which are respectively in right-angular relation with the axis of the clamping member 17.

The tool holder herein described can be used for straight turning, right and left; also for right and left side cutting and threading as well as for cutting off, boring, and drilling. No wrench is necessary for locking and unlocking the cutter in the tool holder.

To tighten the cutter in the tool holder the clamping member or lock should always be turned in the same direction as the material worked upon presses against the cutter. The clamping member 17 may be actuated either to the right or to the left and will lock in either direction in both slots and from opposite sides.

As best shown in Figure 3, I have provided auxiliary clamping screws 25, 25 having knurled heads. The two adjustable knurled screws 25 in the tool holder are positioned to extend from opposite sides of the head 12 and are the means to locate the center alinement or the proper threading alinement for cutting-off tools, or when the cutting tool is being reground without removing the tool holder from position in the tool post.

To permit this centering alinement, I have made the height of the tool slot slightly more than the upright dimension of the cutter. The screws 25 are operated by a hand grip the same as the clamping member 17. The cutter can be locked in any side of the tool holder in which it is placed. The tool holder is reversible and can be swung around and turned over in the tool post and the cutting tool changed around and set for operating on the opposite side to suit any operation. The screws 25, 25 are set so as to intersect both tool slots 13 and 14 and function with either slot for setting the tool bits so that the cutting point will be either below or above the center line, without disturbing the clamping member 17 or the tool holder 10 in a tool post. The screws 25, 25 provide setting-up adjustments independent of the clamping action of the member 17. A tool may thus be clamped by the member 17 and adjusted by the screws 25, 25 and may be locked in said adjusted position by said screws.

In accordance with the patent statutes I have described and illustrated the preferred embodiment of my invention, but it will be understood that various changes and modifications can be made therein without departing from the spirit of the invention as defined by the appended claims.

I may use an anti-friction bearing in place of the roller on the eccentric. I may also employ anti-friction bearings on the bearings 18. I may provide pointers 26, 26, to indicate the open and closed positions of the clamping member 17 inside the head of the tool holder. I may clamp in the tool holder other tools, not necessarily cutting tools.

I claim:

1. A tool holder comprising a head with a transverse opening and two cutting tool slots, said slots being positioned in right-angular relation and communicating with said opening, and a rotatable member having a rolling clamping surface mounted in said opening for clamping a cutting tool in either slot, said clamping member comprising two journals spaced apart and having an intermediate eccentric portion, said tool slots respectively having a side wall in right-angular relation with the axis of said clamping member serving to clamp a tool in alinement therewith.

2. A tool holder comprising a head with a transverse opening and two cutting tool slots, said slots being positioned in right-angular relation and communicating with said opening, a rotatable clamping member mounted in said transverse opening, said clamping member having an eccentric portion with a roller rotatably mounted thereon, said roller being adapted to bear against a cutting tool in either slot, and means for rotating said member for clamping said cutting tool.

3. A tool holder comprising a head with a transverse opening and two cutting tool receiving slots, said slots being positioned in right-angular and intersecting relation and communicating with said opening, a rotatable clamping member mounted in said transverse opening, said clamping member having an eccentric portion with a collar rotatably mounted thereon, said collar being adapted to bear against a cutting tool in either slot, and means for rotating said member for clamping said cutting tool.

4. A tool holder comprising a head with a transverse opening and two cutting tool receiving slots, said slots being positioned in right-angular relation and intersecting relation and communicating with said opening, a cylindrical clamping member rotatably mounted in said transverse opening, said clamping member having two journals and an eccentric portion with a collar rotatably mounted thereon, said head having bearings for said journals, said collar being adapted to bear against a cutting tool in either slot, and means for rotating said clamping member for clamping said cutting tool in said head.

5. In a finger-lock tool holder of the character described, an elongated clamping member comprising knurled end portions and an eccentric intermediate portion, each of said end portions having a reduced end forming a journal, one of said end portions being in the form of a separate collar mounted in fixed engagement on the body of said clamping member after assembling.

6. The invention as defined in claim 5 wherein a roller having concentric peripheries is mounted in rolling engagement on said eccentric.

7. A tool holder comprising a head with a transverse opening and two cutting tool slots, said slots being positioned in right-angular relation and communicating with said opening, and means in said opening for clamping a cutting tool in either slot, said clamping means being adapted for locking and unlocking from opposite sides of said tool holder, said clamping means comprising two journals spaced apart and having an intermediate eccentric portion, said tool slots respectively having a side wall in right-angular relation with the axis of said clamping means serving to clamp a tool in alinement therewith.

8. In a device of the character described, comprising a head with a transverse opening and two slots, said slots being positioned in angular relation and communicating with said opening, and a clamping device including an eccentric having an anti-friction rolling means thereon for clamping an article in either slot, said clamping device comprising two journals and having a collar mounted on one of said journals in fixed engagement after assembling, said tool slots respectively having a side wall in right-angular relation with the axis of said clamping device serving to clamp a tool in alinement therewith.

9. In a reversible tool holder, a rotatable clamping device having a rotatable eccentric carrying an anti-friction rolling means thereon, and finger-controlled means at opposite ends of said clamping device for selectively actuating said eccentric for clamping a tool in said tool holder, said tool holder having means for adjusting the cutting end of said tool without disturbing said clamping device.

10. A tool holder comprising a head with a transverse opening and two tool slots, said slots being positioned in angular relation and communicating with said opening, and finger-controlled anti-friction means in said opening for clamping a tool in either slot, said clamping means comprising two journals spaced apart and having an intermediate eccentric portion, said tool slots respectively having a side wall in right-angular relation with the axis of said clamping means serving to clamp a tool in alinement therewith.

JACOB G. ELKIN.